Patented Oct. 25, 1927.

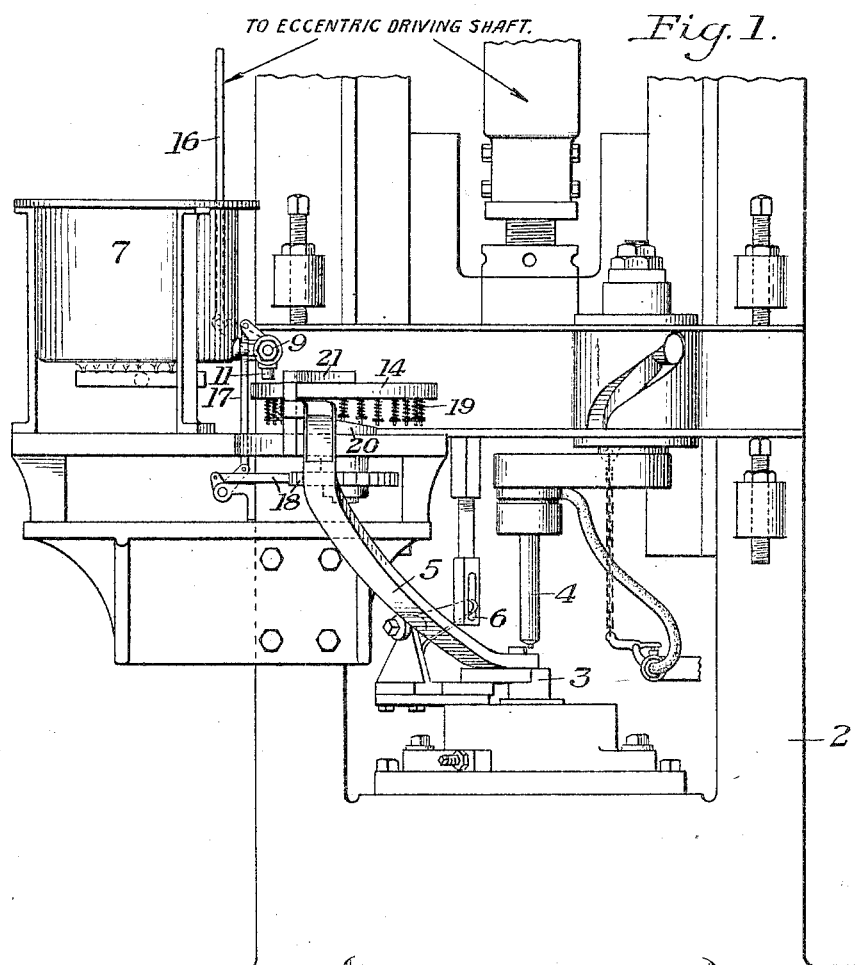
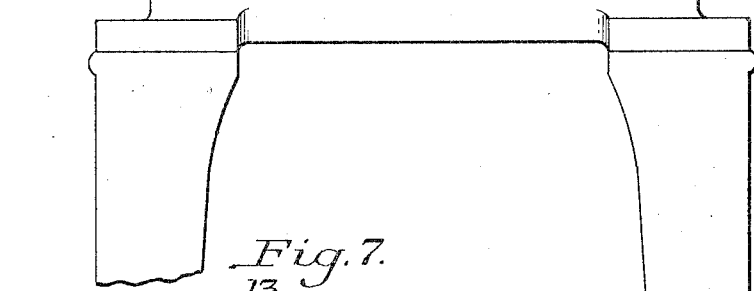
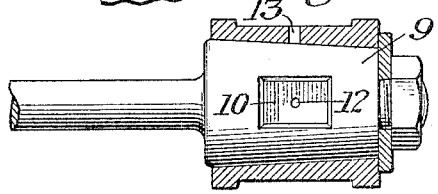

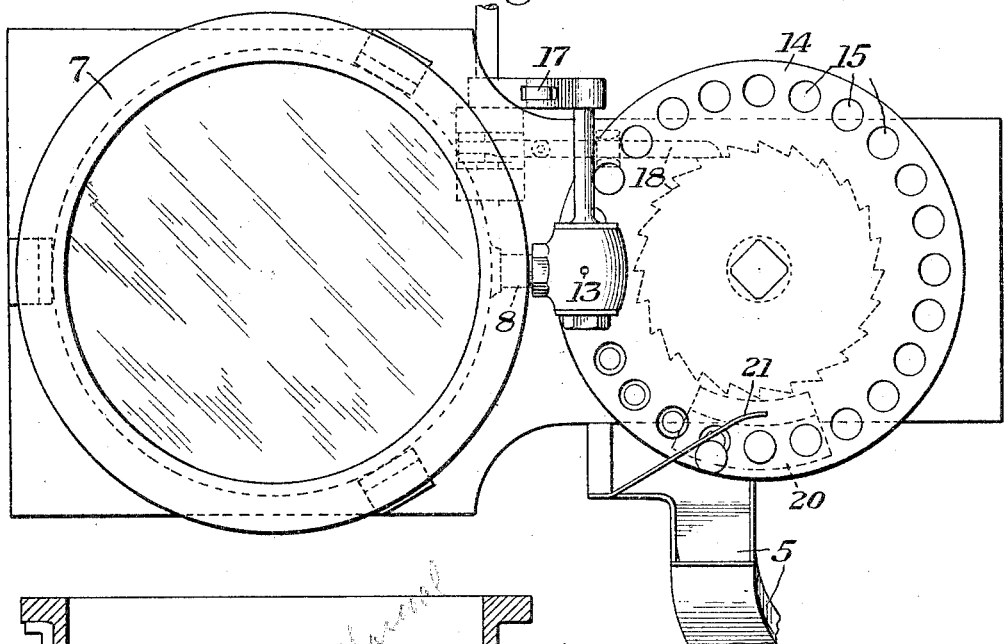
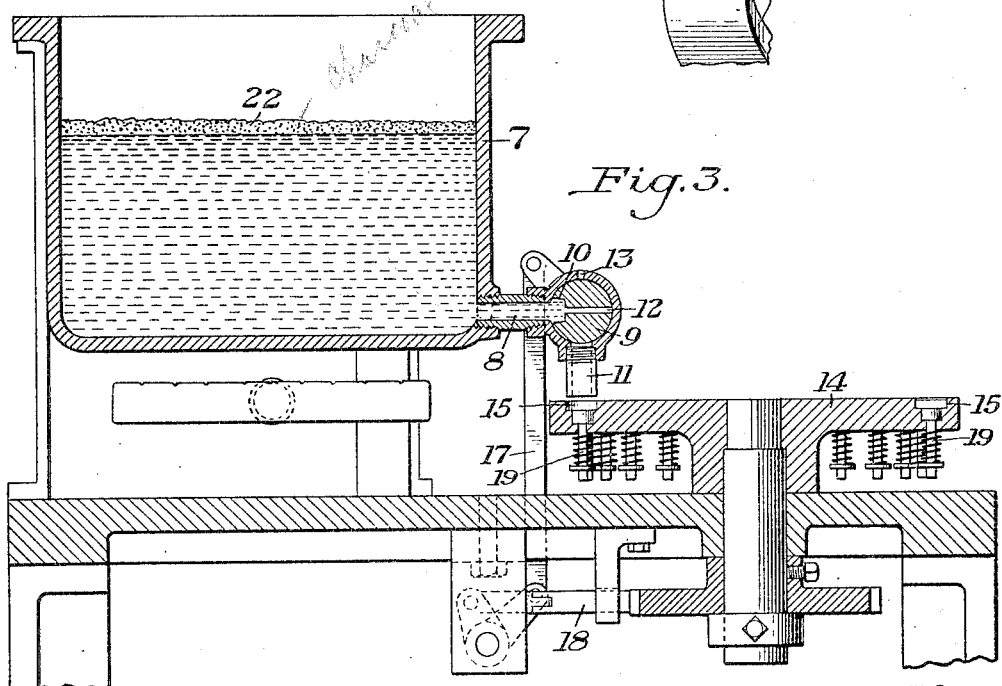

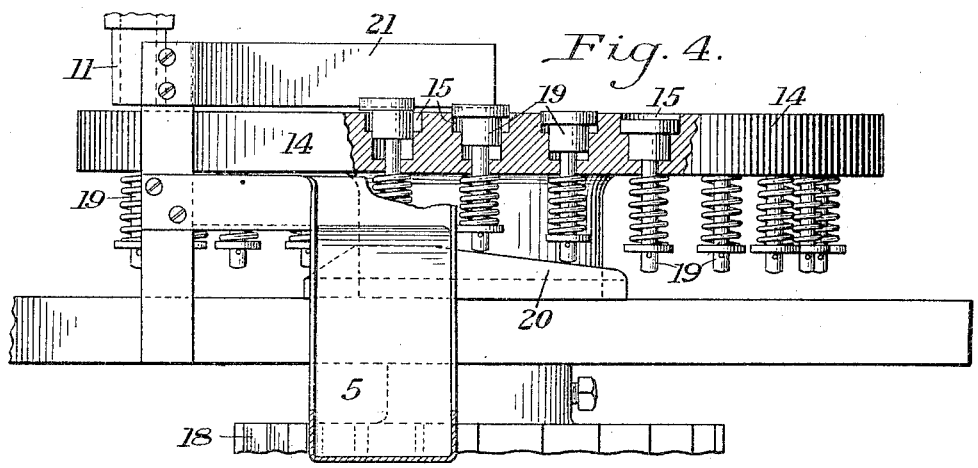
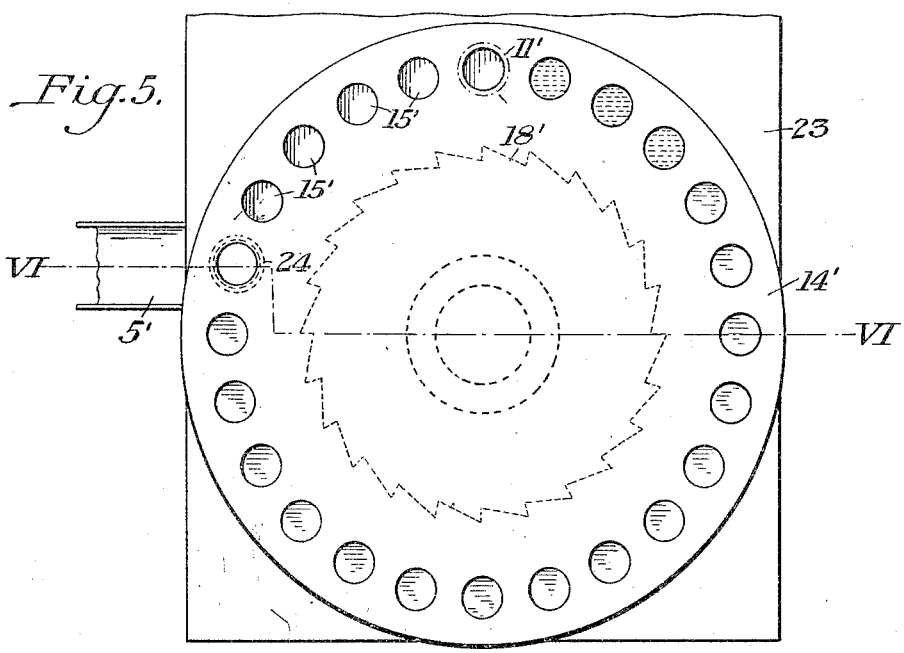
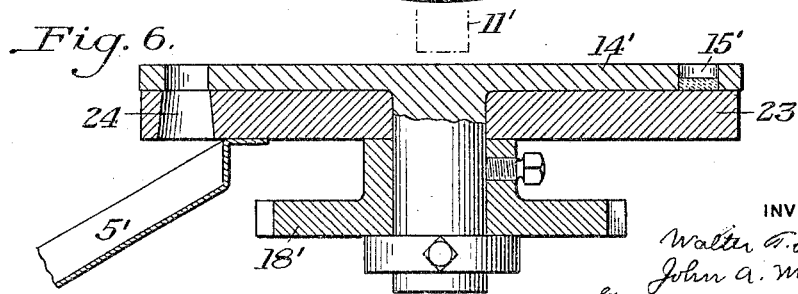

1,646,854

UNITED STATES PATENT OFFICE.

WALTER T. DAVIS AND JOHN A. McGINNIS, OF WHEELING, WEST VIRGINIA, ASSIGNORS TO WHEELING STAMPING COMPANY, OF WHEELING, WEST VIRGINIA, A CORPORATION OF WEST VIRGINIA.

METHOD OF FORMING ARTICLES BY EXTRUSION.

Application filed February 27, 1923. Serial No. 621,536.

The present invention relates broadly to the extrusion of non-ferrous metals, and more particularly to a method and apparatus for the production of articles, such as collapsible tubes. Certain mechanism illustrated herein is more fully disclosed and claimed in our co-pending application No. 65,351, filed October 28, 1925, and constituting a continuation in part of the present invention.

At the present time, it is quite customary in the art to which this invention relates, to melt the required metal in bulk, form ingots therefrom, roll the ingots to the desired thickness and then punch the same to form slugs having the necessary dimensions for the formation of individual articles therefrom.

This operation not only requires several different handling steps, but it results in the formation of considerable scrap which must be reheated and in the formation of a large amount of dross, due to the continuous oxidation of the molten material in the melting tank. It will be apparent that as the individual charges are removed from the upper portion of the tank, the molten material is exposed to oxidation to such an extent that frequently from one to two per cent of the total amount of metal will become oxidized. When it is considered that several thousand pounds are melted each day in the average melting furnace, it will be obvious that this represents a considerable loss.

It also frequently happens that imperfect blanks or slugs are produced by the punching and rolling operations, and these are necessarily thrown away. Before any of the blanks can be used, it is essential that they be tumbled and then lubricated with a suitable material, as well understood in the art. Thereafter, they may be formed into tubes or other articles by extrusion on heavy presses.

By the present invention, the production of tubes and similar articles of this nature is materially simplified, the number of handling operations is decreased, and there is produced a more uniform product at a less cost and on lighter presses.

In the accompanying drawings there is shown, for purposes of illustration only, one embodiment of this invention, it being understood that the drawings do not define the limits of the invention, as changes may obviously be made in the construction and operation disclosed therein without departing from the spirit of the invention or scope of our broader claims.

In the drawings:—

Figure 1 is a front elevation, partly broken away, illustrating a portion of an extrusion press embodying the present invention, Figure 2 is a top plan view, on an enlarged scale, of a portion of the casting apparatus illustrated in Figure 1, Figure 3 is a vertical sectional view through the apparatus illustrated in Figure 2, Figure 4 is a detail view, on an enlarged scale and partly broken away, showing the construction of the casting table illustrated in Figures 1, 2 and 3, Figure 5 is a top plan view similar to Figure 2 illustrating a slightly modified form of casting table, Figure 6 is a transverse sectional view on the line VI—VI of Figure 5, and Figure 7 is a detail view, on an enlarged scale, illustrating the measuring and cutoff valve.

In carrying out the present invention, there may be provided an extrusion press of any well known construction, comprising a suitable frame 2, carrying a fixed die 3 adapted to receive the slugs from which the articles are to be formed. Cooperating with this die may be provided an extrusion plunger 4 adapted to be moved in any desired manner relatively to the die to exert extruding pressure on a blank positioned therein.

For delivering slugs to the die 3 there may be provided a chute 5 in combination with an intermittently actuated pusher mechanism 6. These parts may, if desired, be of the general construction illustrated in a pending application of Walter T. Davis, Serial No. 480,676, filed June 27, 1921, now Patent Number 1,515,383.

In accordance with the present invention, instead of delivering slugs to the chute 5 from the customary hopper, slugs are directly delivered thereto from a casting apparatus which may constitute a unit attachment to the press. This casting apparatus may comprise a melting pot 7 having an outlet 8 controlled by an oscillating cutoff and measuring valve 9. This valve, as clearly shown in Figures 3 and 7, has a recess or pocket 10 formed therein of sufficient capacity to receive just enough molten metal for the production of a single slug, when it is in the position shown in Figure 3. Thereafter, the valve is moved through substantially 90° to bring the pocket 10 into discharging relationship with the tube 11. At this time, the air relief passage 12 in the valve will come into registration with the port 13 in the casing, and thereby permits the discharge of the measured quantity of molten metal from the valve.

Cooperating with the discharge tube 11 is a casting table 14 having a series of pockets 15, which have dimensions substantially equal to the dimensions of the die 3. These pockets are adapted to successively come into registration with the tube 11 and receive the molten material therefrom. The valve 9 and the table 14 are adapted to be operated in predetermined timed relationship to the operation of the press by suitable link connections 16 leading to the eccentric driving shaft which operates the plunger 4. The valve and table may in turn be inter-connected by a suitable link 17 and ratchet 18, as illustrated. In this manner, each time the plunger 4 is operated, there is delivered to one of the pockets 15 a measured charge of molten material.

The step by step movement of the table 14 brings the filled pockets into position in which they are adapted to discharge the hardened and partially cooled slugs, as indicated in Figure 2, into the chute 5. This operation may be automatically effected by providing each of the pockets with a spring pressed ejector 19, the lower ends of which, adjacent the chute 5, are adapted to contact with a stationary cam 20. This causes the ejectors to rise, thereby lifting the slugs upwardly into position where they are engaged by a fixed offtake finger 21 and directed into the chute 5.

In view of the fact that the melting pot 7 discharges molten material from below the surface thereof, the upper surface of the molten mass may be constantly kept covered by a suitable layer of charcoal or similar material 22. In this manner oxidation of the molten material is reduced to a minimum. Also, it will be apparent that the individual slugs are delivered to the die 3 while they are still hot. It has been found that while in this condition the flow of metal, when subjected to extruding pressure, is much more uniform. Also, extrusion may be effected at a considerably lower pressure. In actual operation it has been found that where it is customary to use sixty-ton presses at the present time with punched slugs, it will be possible to use five-ton presses with cast slugs. In actual practice, however, the construction of the press may be varied in accordance with the requirements.

In Figures 5 and 6 there is illustrated a slightly modified form of our invention, in which parts corresponding to parts already described are designated by the same reference characters having a prime affixed thereto. With this construction, the table 14′ is provided with pockets 15′ which extend entirely therethrough. The bottoms of these pockets are closed in all positions of the table, except at the discharging station. This may be effected by providing a stationary plate 23 over which the table rotates, the plate 23 having an opening 24 adapted to permit the cast slugs to drop from the pockets directly into the chute 5′.

It will be apparent that the invention illustrated herein provides an entirely automatic slug forming and delivering mechanism. With the unit casting attachment, each machine may be operated independently of any other machine. At the same time, more uniform tubes or similar articles can be produced at a considerably decreased cost.

The advantages of the present invention arise from the provision of such a method and apparatus providing means for individually forming the individual slugs in synchronism with the operation of the forming machine.

Still further advantages arise from the production by casting of individual slugs, and then the formation of articles therefrom by extrusion before the slugs have completely cooled.

These advantages may be obtained by constructions other than those herein illustrated without departing from the following claims.

We claim:

1. The method of forming articles from non-ferrous metals by extrusion, the steps consisting in casting a slug of the dimensions required for an individual article to be formed, and after the slug becomes hardened subjecting it to extruding pressure, substantially as described.

2. In the method of forming articles from non-ferrous metal by extrusion, the steps consisting in casting a slug of the dimensions required for the formation of a single article, and then subjecting the slug to an extruding pressure between a die and plunger, to form a tube.

3. In the method of forming collapsible tubes by extrusion, the steps consisting in individually molding slugs, each adapted to have a single article produced therefrom, and then individually subjecting the slugs to extruding pressure.

4. In the method of forming collapsible tubes by extrusion, the steps consisting in casting a slug in a die having dimensions substantially equal to the dimensions of the forming die, and then forming an article therefrom by extrusion.

In testimony whereof we have hereunto set our hands.

WALTER T. DAVIS.
JOHN A. McGINNIS.